PULSE GENERATOR EMPLOYING AND-INVERT TYPE LOGICAL BLOCKS

Filed Oct. 6, 1959 2 Sheets-Sheet 1

INVENTOR
GERALD A. MALEY

BY Arthur S. Tenser

ATTORNEY

PULSE GENERATOR EMPLOYING AND-INVERT TYPE LOGICAL BLOCKS

Filed Oct. 6, 1959 2 Sheets-Sheet 2

United States Patent Office 3,075,089

Patented Jan. 22, 1963

3,075,089

PULSE GENERATOR EMPLOYING AND-INVERT TYPE LOGICAL BLOCKS

Gerald A. Maley, Poughkeepsie, N.Y., assignor to International Business Machines Corporation, New York, N.Y., a corporation of New York Filed Oct. 6, 1959, Ser. No. 844,717

13 Claims. (Cl. 307—88.5)

This invention relates to pulse generators and more particularly to a circuit for producing an output pulse of predetermined duration in response to an input pulse of random duration.

As digital computers have gained wide spread scientific, commercial and industrial recognition, it has become necessary to evolve mass production techniques to manufacture this machinery in numbers and at a cost acceptable to a wide range of potential users. In addition, reliability and ease of servicing must be enhanced. Increased utilization of printed circuit techniques and solid state components has markedly advanced the computer industry, but as yet no technique for true mass production has been devised.

The majority of present day computers use solid state components such as transistors almost exclusively in their construction. The small size and reliability of these components has enabled a decrease in size and increase in reliability of digital computers without any sacrifice of performance. One of the common construction techniques is to mount a circuit or circuits on printed circuit cards, whereby each card performs a given function or functions in the machine organization. These cards are adapted to be plugged into mating receptacles in a machine frame. By suitably wiring the terminals of the receptacles in the frame, the printed circuit cards may be interconnected to perform the arithmetic and logical functions of the machine. In the usual machine organization however, a great many individual different types of circuits are required. To minimize the total space occupied by the machine, careful engineering of the placement of circuits on the cards and their interconnection is required. This results in almost custom design of each machine. This technique also raises problems with respect to servicing. Since a great many different printed circuit cards are used in the machine, the servicing organization must have at its disposal a large stock of replacement cards and components. This increases the burden of the service organization with the resultant inconvenience to the user.

It has been found that almost entire digital computing machines may be fabricated out of combinations of a single circuit performing both the AND and INVERT functions. Since only one type of circuit is required to fabricate substantially the entire machine, mass production techniques can be utilized. For example, a printed circuit card can be automatically produced containing a number of such circuits and all of the machine organization can be accomplished by the wiring interconnection between the receptacles in the frame. Thus, only one type of card need be stocked by the serviceman with the attendant advantages. The present invention relates to a pulse generator utilizing this concept, in combination with a novel manner of interconnection of circuit elements.

Accordingly, it is the primary object of this invention to provide an improved pulse generating circuit.

Another object of this invention is to provide a pulse generator fabricated of a number of similar logical circuits.

It is a further object of this invention to provide a pulse generator fabricated of similar circuits which will supply an output pulse of predetermined duration in response to an input pulse of random duration.

Still another object of this invention is to provide a pulse generator producing both in-phase and out-of-phase pulse outputs in response to a single input pulse.

Briefly, the pulse generator of this invention, which is of the type commonly known as a single shot, comprises a plurality of AND-INVERT building blocks interconnected through a plurality of feedback paths, one of which contains the pulse duration determining circuit. In one embodiment, a pair of these building block circuits are interconnected to form a latch while an additional one of said blocks controls the circuit to produce an output pulse of fixed duration regardless of whether the input pulse is shorter or longer than the output pulse. In a second embodiment, an additional AND-INVERT block and two INVERT blocks are provided to extend the versatility of the circuit.

The foregoing and other objects, features, and advantages of the invention will be apparent from the following more particular description of a preferred embodiment of the invention, as illustrated in the accompanying drawings.

Figure 1:
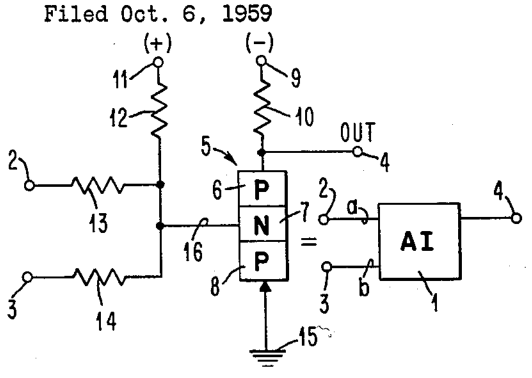
FIG. 1 illustrates a preferred embodiment of the circuitry used in the AND-INVERT building blocks of the invention.

Referring now to FIG. 1 of the drawings, there is illustrated a simple circuit utilizing a transistor which has been found to be particularly desirable for use as the AND-INVERT block 1 of the invention. As shown, the circuit comprises a transistor 5, illustrated as a PNP transistor of the junction type, having a collector 6, and base 7, and an emitter 8. Negative potential source 9 is connected through resistor 10 to supply bias potential to the collector 6. Output terminal 4 is connected directly to the collector 6. Emitter 8 is tied directly to reference potential or ground 15. Connected to the base 7 of the transistor via conductor 16 and resistor 12 is a positive potential source 11 of sufficient magnitude to bias the transistor off. Input terminals 2 and 3 are connected through resistors 13 and 14 respectively to lead 16 and thence to the base 7. The two inputs to the block are labeled as the *a* and *b* inputs respectively.

As is readily apparent, in the non-conducting or off state of the transistor, the output terminal 4 is at the potential of negaive source 9. When the transistor is rendered conductive by application of a suitable signal to its base 7, the output potential rises substantially to ground. For convenience in the ensuing explanation, the output of the transistor in the off condition will be termed the negative level while the output during its conducting time will be termed the positive level. Positive potential source 11 connected to base 7 normaly maintains the transistor 5 in its off or non-conducting condition with the result that its output terminal 4 is at a negative potential level. The resisors 13 and 14 and resistor 12 are so proportioned that a negative level signal applied at either or both of the terminals 2 and 3 will drive the base 7 sufficiently negative with respect to the emitter 8 that the transistor 5 will go into conduction. It will be understood that in the circuitry in which this building block is used, the inputs to 2 and 3 would be the output of similar types of blocks. Therefore, the negative level at the input terminal will be that of the voltage source 9 and a positive level applied thereto will be substantially ground potential. When one or more negative signal levels are applied at the input terminals of the block 1, the transistor is conducting, thereby providing a positive signal level in accordance with the convention set up above. Only if both input signals are at the positive level will the transistor be non-conducting and a negative level be available at the output terminal 4. Any logical block therefore performs two separate functions; and AND function performed by the resistors 12, 13 and 14 which provides the positive level on line 16 only when both input signals are at a positive level, and an INVERT function performed by the transistor 5. It will be realized of course that the AND-INVERT function can be obtained with other types of transistors as well as other circuit elements providing the inversion function, and the circuit illustrated is intended merely as an example of such structure.

Figure 2:
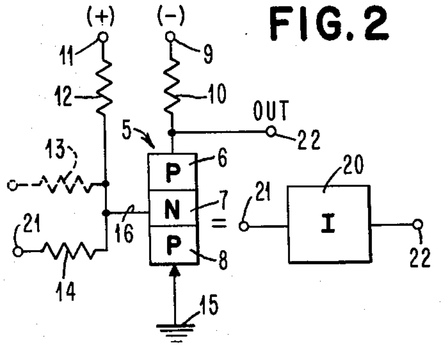
FIG. 2 illustrates a preferred embodiment of the circuitry used for the INVERT block of the invention.

FIG. 2 illustrates a modification of the AND-INVERT circuit of FIG. 1 adapted for use as an inverter only. Like elements of FIG. 2 have the same numerals as their counterparts of FIG. 1. As can be seen from the circuit illustrated, the INVERT block is merely the AND-INVERT circuit with but a single input. This is a simple inverter circuit whose output varies between a negative level equal to the potential 9 and a positive level substantially at ground potential in response to positive and negative signals respectively, at its base. As indicated by the resistor 13 shown in dotted line, the AND-INVERTED block may be use as the INVERT block merely by leaving the terminal of resistor 13 unconnected. In actual practice, the INVERT block is produced in this manner. This permits printed circuit cards of only one type to be used to perform all the functions of the circuit.

Figure 3:
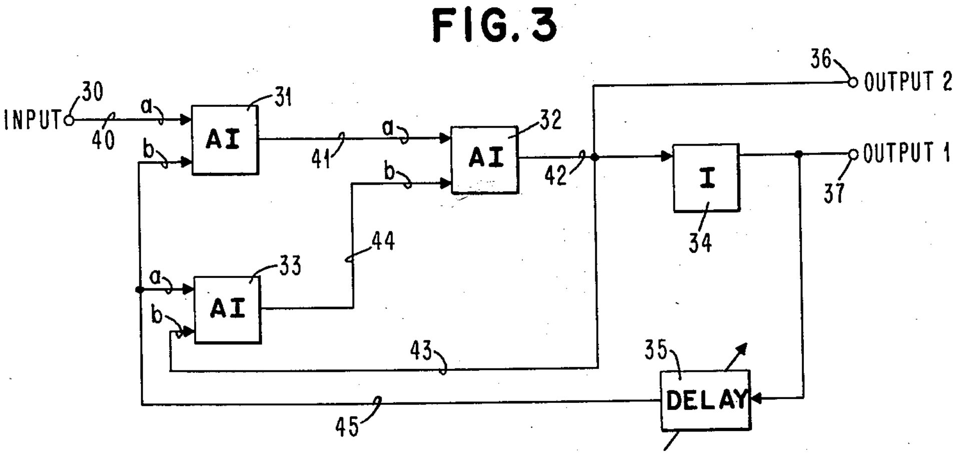
FIG. 3 is a block diagram of the circuit of one embodiment of the pulse generator of this invention using the building blocks illustrated in FIGS. 1 and 2.

One embodiment of the single shot of this invention is shown schematically in FIG. 3. The circuit comprises basicaly three AND-INVERT blocks 31, 32, 33, one INVERT block 34 and a delay element 35. The element 35 may be of any suitable type such as an RC network or a lumped constant delay line and preferably is made variable to provide output pulses of variable duration. An input or trigger pulse is applied at input terminal 30 and over line 40 to the *a* input of block 31. The output of block 31 is applied via conductor 41 as the *a* input to the block 32. Block 33 also has its output connected over line 44 to the *b* input of block 32. The output of block 32 is applied to the *b* input of block 33 over feedback path comprising conductors 42 and 43 and to the *a* input of block 33 and the *b* input of block 31 via a feedback path including the INVERT block 34, the delay element 35, and conductor 45. An out-of-phase output is available at terminal 37 connected to the output of INVERT block 34 and an in-phase output at terminal 36 is available at the output of block 32.

Considering the waveforms of FIG. 4 in conjunction with the circuit of FIG. 3, the pulse generator operates as follows. At time $t_1$, the input signal is at a negative level. The output of block 31 is therefore at a positive potential, as explained in connection with FIG. 1. Assuming the *b* input to block 32 to be positive also, the output at line 42 is therefore at a negative level. This negative level is fed back over conductor 43 to the *b* input of block 33, thereby maintaining line 41 at a positive level. The negative level at the output of 32 is also coupled through inverter 34 which converts it to a positive level, and delay element 35 over conductor 45 to the *a* and *b* inputs respectively of blocks 33 and 31. Assuming no input has been applied at terminal 30 for some time, the circuit will remain in the condition above described with output 1 at a positive level and output 2 at a negative level.

Application of a positive input pulse at terminal 30 will now change the condition of block 31, producing a negative level at its output. This in turn switches the condition of block 32 which previously had two positive inputs applied to it. Therefore output line 42 switches from a negative to a positive level. This positive level is immediately transferred over line 43 to the *b* input of block 33. It is also inverted to a negative level by block 34 and applied to delay element 35. Because of the delay occasioned by element 35, this negative level is not immediately applied to the *a* input of block 33. Thus for a period of time determined by the magnitude of the delay, both inputs to block 33 are at their positive level, thereby providing a negative level at its output. This negative level is connected over line 44 to the *b* input of block 32 to maintain the output of block 32 at a positive level. This describes the condition present at time $t_2$ shown in FIG. 4. The output 2 is now at a positive level and the output 1 at its negative level. It is noted that the interconnection of blocks 32 and 33 forms a latch which tends to maintain these blocks in the state just described. Therefore, when the input pulse A drops negative, thereby providing a positive output at line 41, no change is effected in the circuit since the *b* input to block 32 is already at a negative level. This is the condition at time $t_3$.

After the delay caused by element 35, a negative level is applied to the *a* input of block 33 over line 45. This changes the state of block 33 to provide a positive signal level at its output. Since in the meantime, as described above, the input signal had dropped to its negative level, the output of block 31 is also positive, making both inputs to block 32 at the positive level. This changes the state of block 32 to provide a negative level at its output as shown at $t_4$ in FIG. 4.

After a time equal to or greater than the delay provided by element 35 subsequent to the termination of the output pulse, the circuit has again returned to its normal or quiescent condition as explained in connection with time $t_1$, and is ready for another input pulse. This is shown at $t_5$ in FIG. 4.

Figure 4:
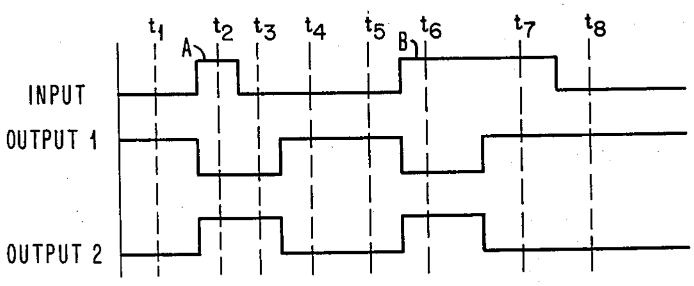
FIG. 4 illustrates several waveforms useful in explaining the operation of the circuit in FIG. 3.

A second input pulse B illustrated in FIG. 4 is shown to be greater in duration than that of the desired output pulse to illustrate the operation of the circuit under these conditions. Application of the pulse B to the input terminal 30 begins operation of the circuit and the condition at $t_6$ is the same as described at time $t_2$. The output of block 31 switches from its positive level to its negative level, the output of block 32 switches from the negative to a positive level, and the output of block 33 switches from its positive to its negative level to latch the circuit in that condition. At the termination of the time determined by delay element 35, the *a* and *b* inputs respectively of blocks 33 and 31 go negative, thereby changing the output of these blocks from negative to positive levels. With respect to block 31, it is seen that this change in output level will occur even if the input line remains at the positive level, such as when the input pulse exceeds in length the desired output pulse. The circuit is now in condition shown at time $t_7$. Upon termination of the input pulse B, the circuit returns to its normal or quiescent state to await the next input pulse. This is shown as time $t_8$ in FIG. 4. It is necessary only that the duration of input pulse B be less than twice the delay presented by element 35. Otherwise, pulses of any duration within this limit will be accepted by the circuit.

Figure 5:
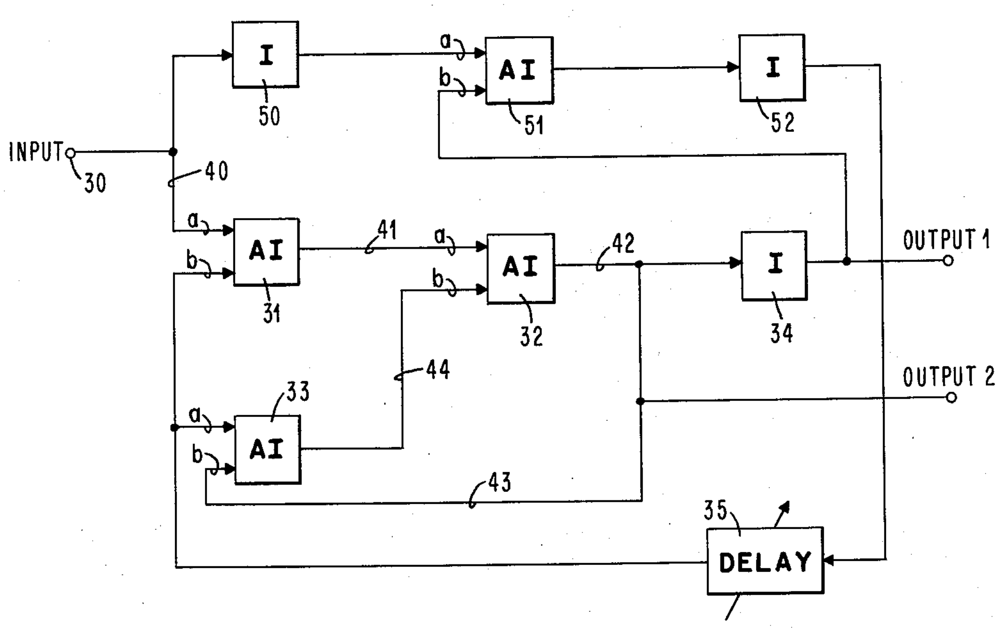
FIG. 5 is a block diagram of another embodiment of the pulse generator of this invention.

The circuit of FIG. 5 shows a modification of the circuit of FIG. 3 wherein the limitation that the input pulse must be less than twice the duration of the output pulse is avoided. As can be seen, the circuit of FIG. 5 includes all the elements of the circuit of FIG. 3 and like parts thereof have the same reference numerals. The additional elements of FIG. 5 comprise an INVERT block 50 to which the input terminal 30 is coupled, an AND-INVERT block 51 having its *a* input supplied by the output of the INVERT block 50 and its *b* input supplied by the output of the INVERT block 34, and a second INVERT block 52 having its input supplied from the output of AND-INVERT block 51. The output of INVERT block 52 is coupled through the delay element 35 to the *b* and *a* inputs of blocks 31 and 33 respectively. This connection differs from that of FIG. 3 in that in the latter figure the output of INVERT block 34 is connected through the delay element 35 whereas in FIG. 5 it is the output of the inverter 52 which is coupled to the delay element.

Figure 6:
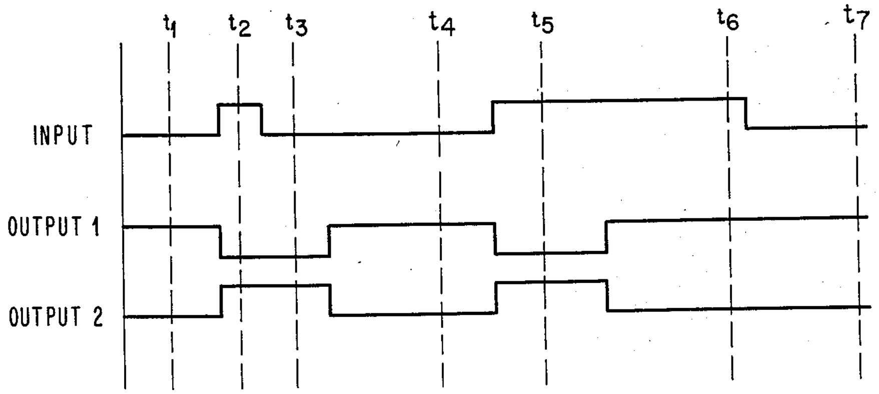
FIG. 6 is a series of waveforms useful in explaining the operation of the circuit of FIG. 5.

Initial conditions of the circuit of FIG. 5 are the same as that discussed in connection with FIG. 3; input 30 is at its negative level. Output 1 is a positive level and output 2 is a negative level. Assuming that the circuit has been in this condition for a period greater than the delay of the delay element 35, the input to INVERT block 50 will be negative, thereby supplying a positive *a* input to block 51. The *b* input to block 51 is also positive since output 1 is positive; therefore block 51 has a negative output which is supplied to INVERT block 52. The positive output of INVERT block 52 is fed through delay element 35 to supply a positive *b* input to block 31 and a positive *a* input to block 33. Since the *a* input to block 31 is negative, its output is positive, providing a positive *a* input to block 32. With output 2 at its negative level, the *b* input to block 33 is negative, thereby resulting in a positive level at its output. Block 32 therefore has both *a* and *b* inputs at positive levels thus producing a negative level at its output. This is the condition at time $t_1$ of FIG. 6 and the circuit will remain in this condition until the arrival of input pulse A.

When the input goes positive, INVERT block 50 supplies a negative *a* input to block 51, whose output thereby goes positive. The positive input also renders the *a* input to block 31 positive, making its output go negative and consequently switching the output of block 32 from a negative to a positive level. The positive output of block 32 is inverted by block 34 and provides a negative *b* input to block 51 to latch the latter with its output positive. The positive output of block 51 is inverted by block 52 thereby causing a negative shift at the input to delay element 35.

The now positive output of block 32 is also coupled over conductor 43 to the *b* input of block 33 which now has both inputs positive. Its output therefore goes negative supplying a negative *b* input to block 32. It is noted at this point that the *a* input of block 33 and the *b* input to block 31 are still at the positive level, the negative shift at the input of delay element 35 not yet having reached these inputs. This is the condition of the circuit at time $t_2$ of FIG. 6.

When the input goes negative again, the output of INVERT block 50 changes, however block 51 is not affected since the *b* input remains negative. Similarly the *a* input to block 31 goes negative and its output positive, however block 32 has its *b* input at a negative level and does not change. It is seen then that circuit operation is not affected by the fact that the input pulse is shorter than that of the desired output pulse. This is shown at $t_3$ in FIG. 6.

At the end of the time occasioned by delay element 35, its output goes negative thereby providing negative inputs to the *a* input and *b* input of blocks 33 and 31 respectively. This does not affect block 31 whose output was already positive, however block 33 is now switched to produce a positive output. Block 32 now has two positive inputs and therefore a negative output. This negative output is coupled back to the *b* input of block 33 to latch block 33 in this condition and is also applied through INVERT block 34 to the *b* input of block 51, which then switches to provide a negative output. This negative output is inverted by block 52 and applied through the delay element 35 back to the inputs of blocks 31 and 33. At the end of another delay period, the *b* input to block 31 goes positive again and the *a* input to block 33 goes positive again and the circuit is in the condition shown as $t_4$. This is the same state as at time $t_1$.

When the B pulse arrives, the circuit first goes into the condition shown at $t_5$ which is the same as the condition at time $t_2$. This means that block 51 has both *a* and *b* inputs negative and a positive output; block 31 has a positive *a* input, a positive *b* input and a negative output; block 33 has a positive *a* input, a positive *b* input and a negative output and block 32 has two negative inputs and a positive output. The circuit will remain in this condition until the end of a single delay period. At that time, the *b* and *a* inputs to blocks 31 and 33 respectively go negative, thereby switching their respective blocks to positive outputs. Block 32 therefore switches to provide a negative output. This is inverted by block 34 to provide a positive *b* input to block 51. The latter however has its *a* input remaining at a negative level since the input has not changed, thereby maintaining its output at a positive level. Thus no input change is provided to delay element 35. This is the condition shown at time $t_6$ and as can be appreciated, it is a stable condition and the circuit will remain here indefinitely until a change in input signal occurs.

When the input signal goes negative again, the *a* input to block 51 goes positive, switching its output to a negative level to thereby produce a shift at the input of delay element 35. At the same time the *a* input to block 31 is going negative. However, this block has its *b* input negative and is not affected thereby. At the conclusion of the delay, the *b* input to block 31 goes positive and the *a* input to block 33 goes positive. However, both of these blocks previously had negative inputs and thereby are switched by these changes. This is the condition shown at time $t_7$ and the circuit is ready for another input pulse.

It can be seen from the preceding discussion, that the circuit of FIG. 5 will produce a single output pulse in response to each input pulse regardless of the duration of the input pulse. As will be recognized, the circuit is basically the same as the circuit of FIG. 3, with the addition of an added latching arrangement provided by INVERT blocks 50 and 52 and AND-INVERT block 51. By addition of these elements, the utility of the basic circuit of FIG. 3 is extended to the situation where the input pulse may be of a duration greater than twice the desired output pulse.

It can be seen from the foregoing that a single shot pulse generator is provided consisting of a plurality of similar, individual logical circuits. If, for example, three of such logical circuits are printed on a single card using mass production techniques, the entire circuit of FIG. 3 may be fabricated on two such cards and still leave two circuits for use in other circuitry, while the circuit of FIG. 5 would require 2 cards plus a single circuit on an additional card. The only wiring other than interconnection of the receptacles for the said terminals would be the connections required to insert the delay element. Complementary outputs are available, providing greater versatility in logical circuitry without added components, and because of the requirement for only two voltage levels (other than ground), power supply requirements are minimized. This two level operation also enhances the reliability of the circuit.

While the invention has been particularly shown and described with reference to a preferred embodiment thereof, it will be understood by those skilled in the art that various changes in form and detail may be made therein without departing from the spirit and scope of the invention.

What is claimed is:

1. A pulse single shot generator comprising, a plurality of logical circuits performing similar logical functions, at least one input and an output for each of said circuits, means applying an input signal to an input of a first of said circuits, the output of said first circuit being connected to an input of a second of said circuits, a third of said circuits having an output connected to an additional input of said second circuit, a first feedback means coupling the output of said second circuit to an input of said third circuit, and a second feedback means including delay means coupling the output of said second circuit to additional inputs of said first and third circuits.

2. The apparatus of claim 1 above wherein said second feedback means comprises an additional one of said logical circuits.

3. The apparatus of claim 1 above wherein said second feedback means comprises an additional one of said logical circuits responsive to the output of said second circuit.

4. The apparatus of claim 1 above including an output circuit wherein an output pulse is derived at the output of said second circuit, the duration of said pulse being determined by the delay provided by said delay means.

5. Pulse producing apparatus for generating a pulse of a predetermined duration comprising, a pair of logical circuits, each performing both AND and INVERT function; means cross-coupling said pair of logical circuits to form a latch having first and second stable conditions and normally set in the first stable condition, means supplying an input pulse to a first circuit of said pair, each input pulse adapted to set the latch in the second stable condition, means providing an output signal and a time delay means connecting the output of said first circuit to the input of the second circuit of said pair to control the duration of the output signal.

6. The apparatus of claim 5 above further comprising an additional one of said logical circuits coupling the input pulse to said first circuit.

7. The apparatus of claim 5 above further comprising an additional one of said logical circuits responsive to both said input pulse and the output of said first circuit interposed in said means connecting the output of said first circuit to the input of said second circuit.

8. A pulse generator for producing a pulse of predetermined duration in response to an input pulse of random duration comprising first, second, and third, logical circuits each having an output, a pair of inputs and performthe AND-INVERT function, means connecting the output of said first circuit to one input of said second circuit, means connecting the output of said third circuit to the other input of said second circuit, means supplying input pulses to one input of said third circuit, means connecting the output of said second circuit to one input of said first circuit, and means providing a time delay connecting the output of said second circuit to the other inputs of said first and third circuits.

9. The pulse generator of claim 8 above further comprising phase inverting means interposed in said last named connecting means.

10. The pulse generator of claim 9 above further comprising output means for deriving in-phase and out-of-phase outputs from the output of said second circuit and said phase inverting means respectively.

11. A pulse generator for producing a pulse of predetermined duration in response to an input pulse of random duration comprising, first, second, third and fourth logical circuits each having an output, a pair of inputs and performing the AND-INVERT function, means connecting the output of said first circuit to one input of said second circuit, means connecting the output of said third circuit to the other input of said second circuit, means supplying input pulses to one input of each of said third and fourth circuits, means connecting the output of said second circuit to one input of said first circuit and through phase inverting means to the other input of said fourth circuit, and means providing a time delay connecting the output of said fourth circuit to the other inputs of said first and third circuits.

12. The pulse generator of claim 11 above wherein said means for supplying input pulses to said one input of said fourth circuit provides a phase inversion.

13. The pulse generator of claim 12 above further comprising means for deriving in-phase and out-of-phase outputs from the output of said second circuit and said phase inverting means respectively.

References Cited in the file of this patent

UNITED STATES PATENTS

| | | |
|---|---|---|
| 2,892,933 | Shaw | June 30, 1959 |
| 2,942,192 | Lewis | June 21, 1960 |

FOREIGN PATENTS

| | | |
|---|---|---|
| 1,182,913 | France | Jan. 19, 1959 |

OTHER REFERENCES

"Arithmetic Operations in Digital Computers," by R. K. Richards, February 1955, D. Van Nostrand Co.